United States Patent
Mathe et al.

(10) Patent No.: US 8,896,721 B2
(45) Date of Patent: *Nov. 25, 2014

(54) ENVIRONMENT AND/OR TARGET SEGMENTATION

(71) Applicant: Microsoft Corporation, Redmond, WA (US)

(72) Inventors: Zsolt Mathe, Issaquah, WA (US); Charles Claudius Marais, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,708

(22) Filed: Jan. 11, 2013

(65) Prior Publication Data

US 2013/0129227 A1  May 23, 2013

Related U.S. Application Data

(63) Continuation of application No. 12/475,094, filed on May 29, 2009, now Pat. No. 8,379,101.

(51) Int. Cl.
| | |
|---|---|
| *H04N 5/228* | (2006.01) |
| *G06K 9/00* | (2006.01) |
| *A63F 13/40* | (2014.01) |
| *G06T 7/00* | (2006.01) |
| *G06K 9/34* | (2006.01) |

(52) U.S. Cl.
CPC ........ *G06K 9/00577* (2013.01); *G06K 9/00342* (2013.01); *A63F 13/10* (2013.01); *A63F 2300/1087* (2013.01); *G06T 2207/30196* (2013.01); *G06T 7/0081* (2013.01); *G06T 2207/10028* (2013.01); *A63F 2300/6045* (2013.01); *G06K 9/34* (2013.01)
USPC ........................................ 348/222.1; 382/203

(58) Field of Classification Search
None
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |

(Continued)

FOREIGN PATENT DOCUMENTS

| | | |
|---|---|---|
| CN | 1395231 A | 2/2003 |
| CN | 101254344 B | 6/2010 |

(Continued)

OTHER PUBLICATIONS

"Virtual High Anxiety", Tech Update, Aug. 1995, pp. 22.

(Continued)

*Primary Examiner* — Luong T Nguyen
(74) *Attorney, Agent, or Firm* — Gregg Wisdom; Judy Yee; Micky Minhas

(57) ABSTRACT

A depth image of a scene may be observed or captured by a capture device. The depth image may include a human target and an environment. One or more pixels of the depth image may be analyzed to determine whether the pixels in the depth image are associated with the environment of the depth image. The one or more pixels associated with the environment may then be discarded to isolate the human target and the depth image with the isolated human target may be processed.

20 Claims, 16 Drawing Sheets

(56) References Cited

U.S. PATENT DOCUMENTS

| | | |
|---|---|---|
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,201,011 A | 4/1993 | Bloomberg |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,536 A | 11/1995 | Blank |
| 5,469,740 A | 11/1995 | French et al. |
| 5,475,507 A | 12/1995 | Suzuki |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,016,411 B2 | 3/2006 | Azuma et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 * | 1/2008 | Fujimura et al. .............. 382/203 |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |

(56) References Cited

U.S. PATENT DOCUMENTS

| | | | |
|---|---|---|---|
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,379,101 B2* | 2/2013 | Mathe et al. | 348/222.1 |
| 8,379,987 B2* | 2/2013 | Chai et al. | 382/203 |
| 2003/0156756 A1* | 8/2003 | Gokturk et al. | 382/190 |
| 2004/0155962 A1 | 8/2004 | Marks | |
| 2004/0207597 A1 | 10/2004 | Marks | |
| 2005/0059488 A1 | 3/2005 | Larsen et al. | |
| 2005/0215319 A1 | 9/2005 | Rigopulos et al. | |
| 2006/0087518 A1* | 4/2006 | Ameline et al. | 345/611 |
| 2006/0188144 A1 | 8/2006 | Sasaki et al. | |
| 2006/0239558 A1 | 10/2006 | Rafii et al. | |
| 2007/0013718 A1 | 1/2007 | Ohba | |
| 2007/0060336 A1 | 3/2007 | Marks et al. | |
| 2007/0098222 A1 | 5/2007 | Porter et al. | |
| 2007/0110298 A1 | 5/2007 | Graepel et al. | |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0026838 A1 | 1/2008 | Dunstan et al. | |
| 2008/0062257 A1 | 3/2008 | Corson | |
| 2008/0095436 A1 | 4/2008 | Kim et al. | |
| 2008/0100620 A1 | 5/2008 | Nagai et al. | |
| 2008/0118118 A1 | 5/2008 | Berger | |
| 2008/0126937 A1 | 5/2008 | Pachet | |
| 2008/0134102 A1 | 6/2008 | Movold et al. | |
| 2008/0152191 A1 | 6/2008 | Fujimura et al. | |
| 2008/0215972 A1 | 9/2008 | Zalewski et al. | |
| 2008/0215973 A1 | 9/2008 | Zalewski et al. | |
| 2008/0278487 A1 | 11/2008 | Gobert | |
| 2009/0044136 A1 | 2/2009 | Flider | |
| 2009/0085864 A1 | 4/2009 | Kutliroff et al. | |
| 2009/0141933 A1 | 6/2009 | Wagg | |
| 2009/0167679 A1 | 7/2009 | Klier et al. | |
| 2009/0213240 A1 | 8/2009 | Sim et al. | |
| 2009/0221368 A1 | 9/2009 | Yen et al. | |

FOREIGN PATENT DOCUMENTS

| | | |
|---|---|---|
| EP | 0583061 A2 | 2/1994 |
| JP | 08044490 A | 2/1996 |
| WO | WO 93/10708 A1 | 6/1993 |
| WO | WO 97/17598 A1 | 5/1997 |
| WO | WO 99/15863 A1 | 4/1999 |
| WO | WO 99/44698 A2 | 9/1999 |
| WO | WO 01/59975 A2 | 8/2001 |
| WO | WO 02/082249 A2 | 10/2002 |
| WO | WO 03/001722 A2 | 1/2003 |
| WO | WO 03/046706 A1 | 6/2003 |
| WO | WO 03/054683 A2 | 7/2003 |
| WO | WO 03/071410 A2 | 8/2003 |
| WO | WO 03/073359 A2 | 9/2003 |
| WO | WO 2009/059065 A1 | 5/2009 |

OTHER PUBLICATIONS

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Isard et al., "CONDENSATION—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

PCT Application No. PCT/US2010/035902: International Search Report and Written Opinion of the International Searching Authority, Dec. 22, 2010, 8 pages.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

(56) References Cited

OTHER PUBLICATIONS

Shivappa et al., "Person Tracking with Audio-Visual Cues Using Iterative Decoding Framework", IEEE Fifth International Conference on Advanced Video and Signal Based Surveillance, AVSS '08, Santa FE, NM, Sep. 1-3, 2008 260-267.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

Wells, M. et al., "Automatic Visual Tracking for Analysis of Lifting", SME Technical Paper, Society of Manufacturing Engineers, 2005, TP05PUB80; 11 pages.

Wernicke, A. et al., "On the Segmentation of Text in Videos", IEEE, 2000, http://ieeexplore.ieee.org/stamp, pp. 1511-1514.

\* cited by examiner

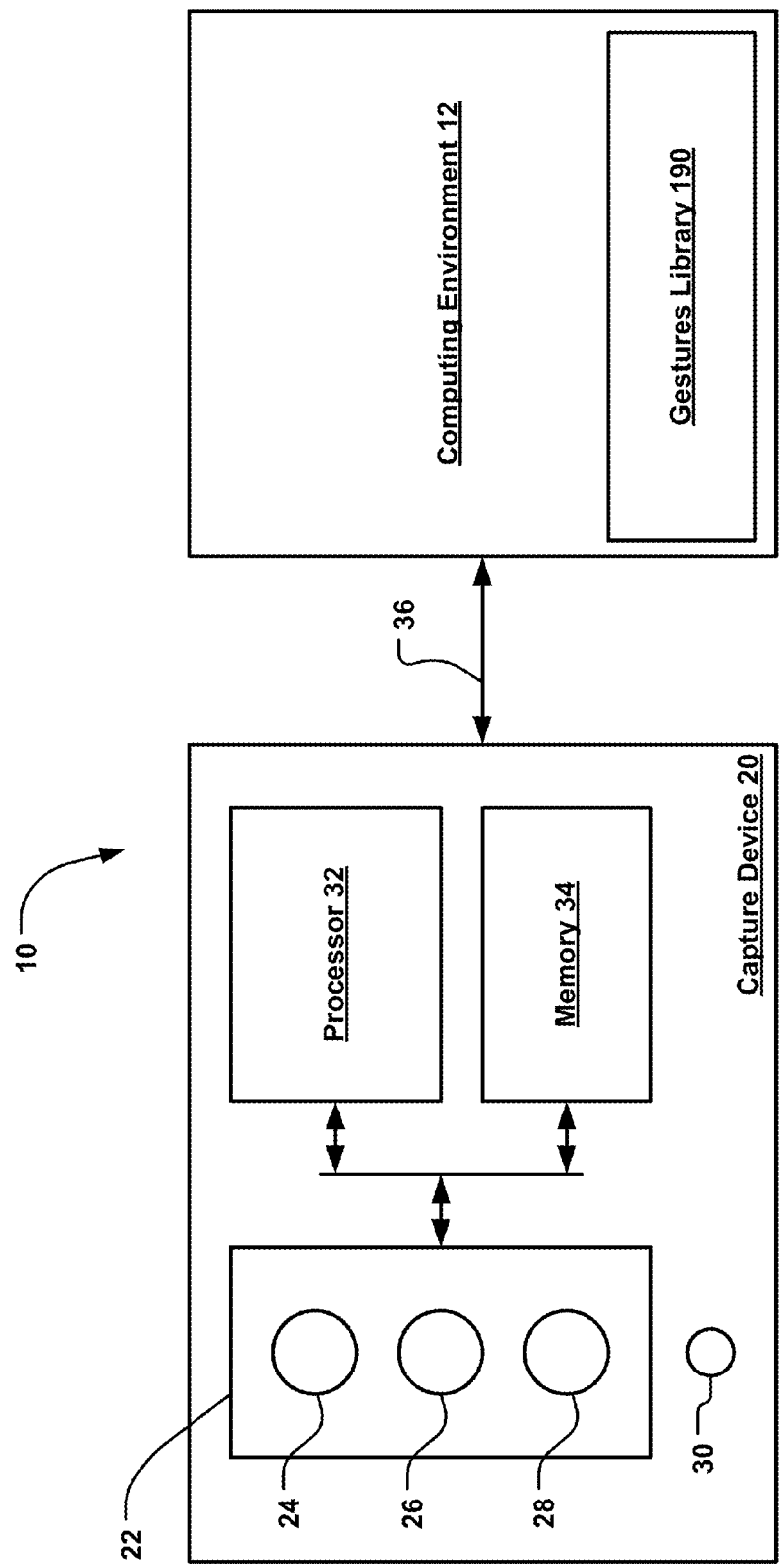

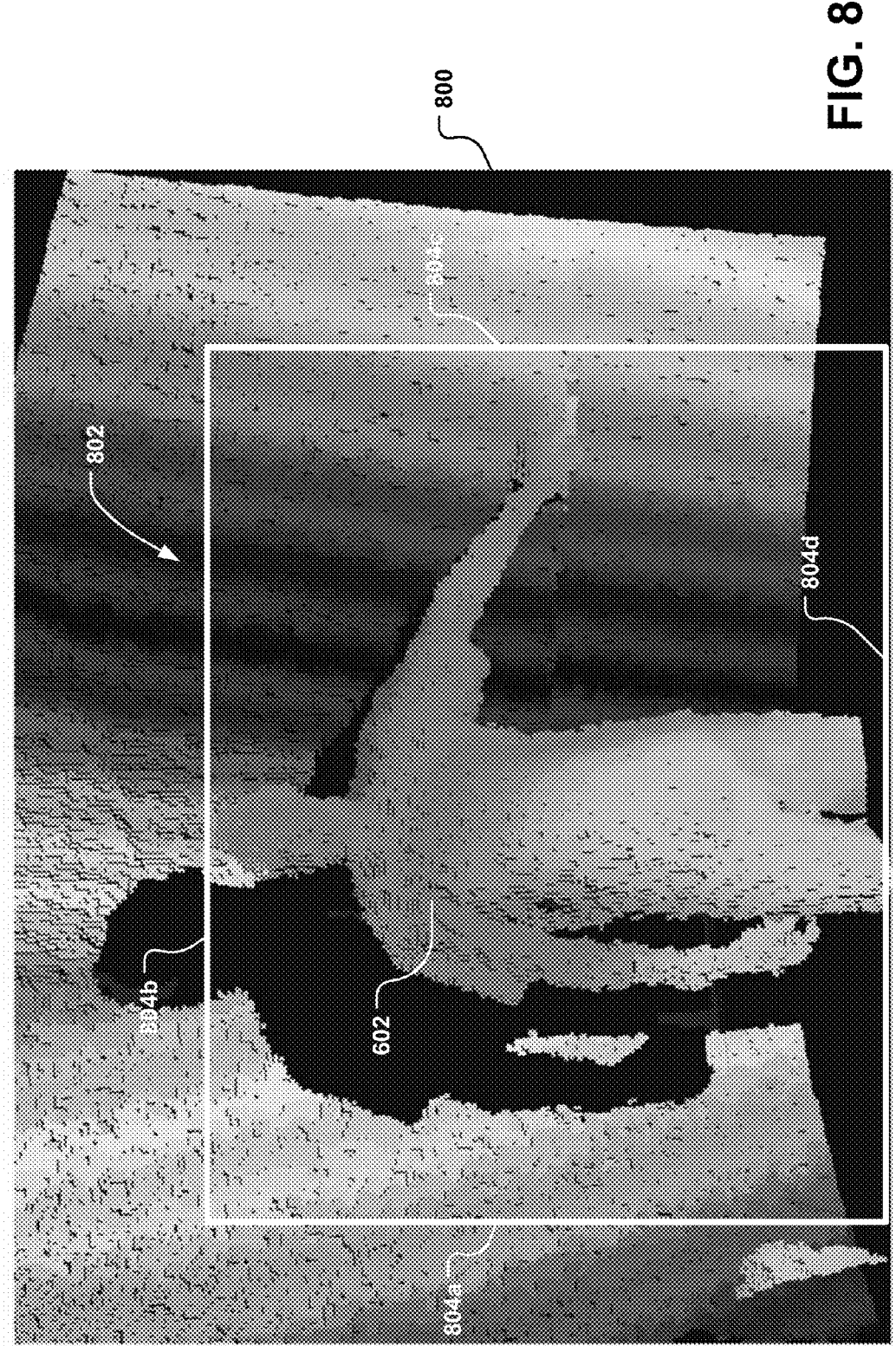

us 8,896,721 B2

ENVIRONMENT AND/OR TARGET SEGMENTATION

CROSS REFERENCE TO RELATED APPLICATIONS

This application is a continuation of U.S. patent application Ser. No. 12/475,094 filed on May 29, 2009, the entire contents of which is incorporated herein by reference.

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for processing depth information of a scene that may be used to interpret human input. For example, a depth image of the scene may be received, captured, or observed. The depth image may include a human target and an environment such as a background, one or more non-human target foreground object, or the like. According to an example embodiment, the depth image may be analyzed to determine one or more pixels associated with the human target and the environment such as the pixels that may not be associated with the human target, or the non-player pixels. The one or more pixels associated with the environment may then be removed from the depth image such that the human target may be isolated in the depth image. The isolated human target may be used to track a model of human target to, for example, animate an avatar and/or control various computing applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 illustrates an example embodiment of a capture device that may be used in a target recognition, analysis, and tracking system.

FIG. 8 illustrates an example embodiment of a depth image with a bounding box that may be defined around a human target.

DETAILED DESCRIPTION OF ILLUSTRATIVE EMBODIMENTS

As will be described herein, a user may control an application executing on a computing environment such as a game console, a computer, or the like by performing one or more gestures. According to one embodiment, the gestures may be received by, for example, a capture device. For example, the capture device may capture a depth image of a scene. In one embodiment, the depth image of the scene may be received, captured, or observed. The depth image may include a human target and an environment such as a background, foreground objects that may not be associated with the human target, or the like. In an example embodiment, the environment may include one or more non-human targets such as a wall, furniture, or the like. The depth image may be analyzed to determine whether one or more pixels are associated with the environment and the human target. The one or more pixels associated with the environment may be removed or discarded to isolate the foreground object. The depth image with the isolated foreground object may then be processed. For example, as described above, the isolated foreground object may include a human target. According to an example embodiment, a model of human target, or any other desired shape may be generated and/or tracked to, for example, animate an avatar and/or control various computing applications.

Figure 1A:
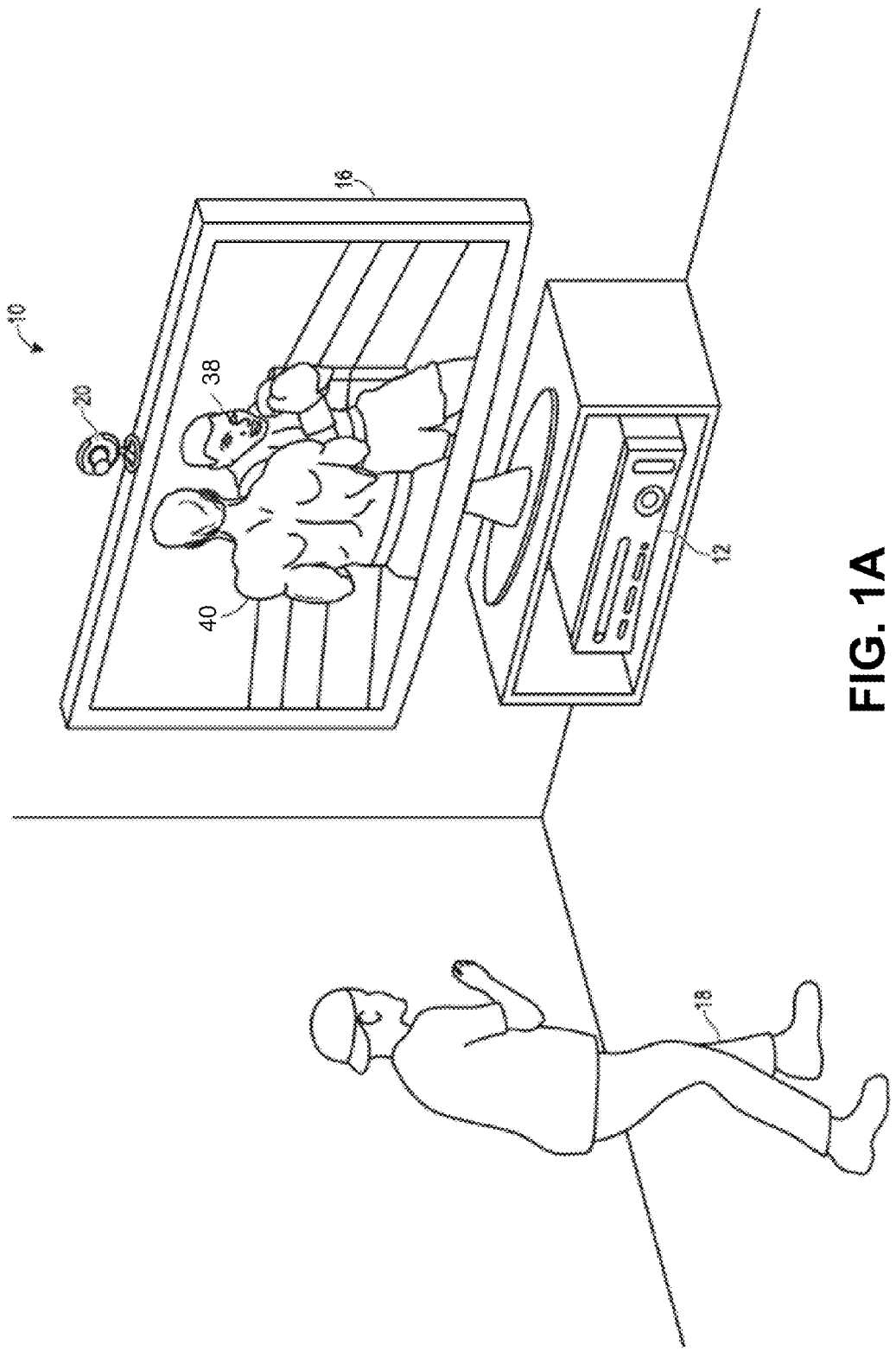
FIGS. 1A and 1B illustrate an example embodiment of a target recognition, analysis, and tracking system with a user playing a game.
Figure 1B:
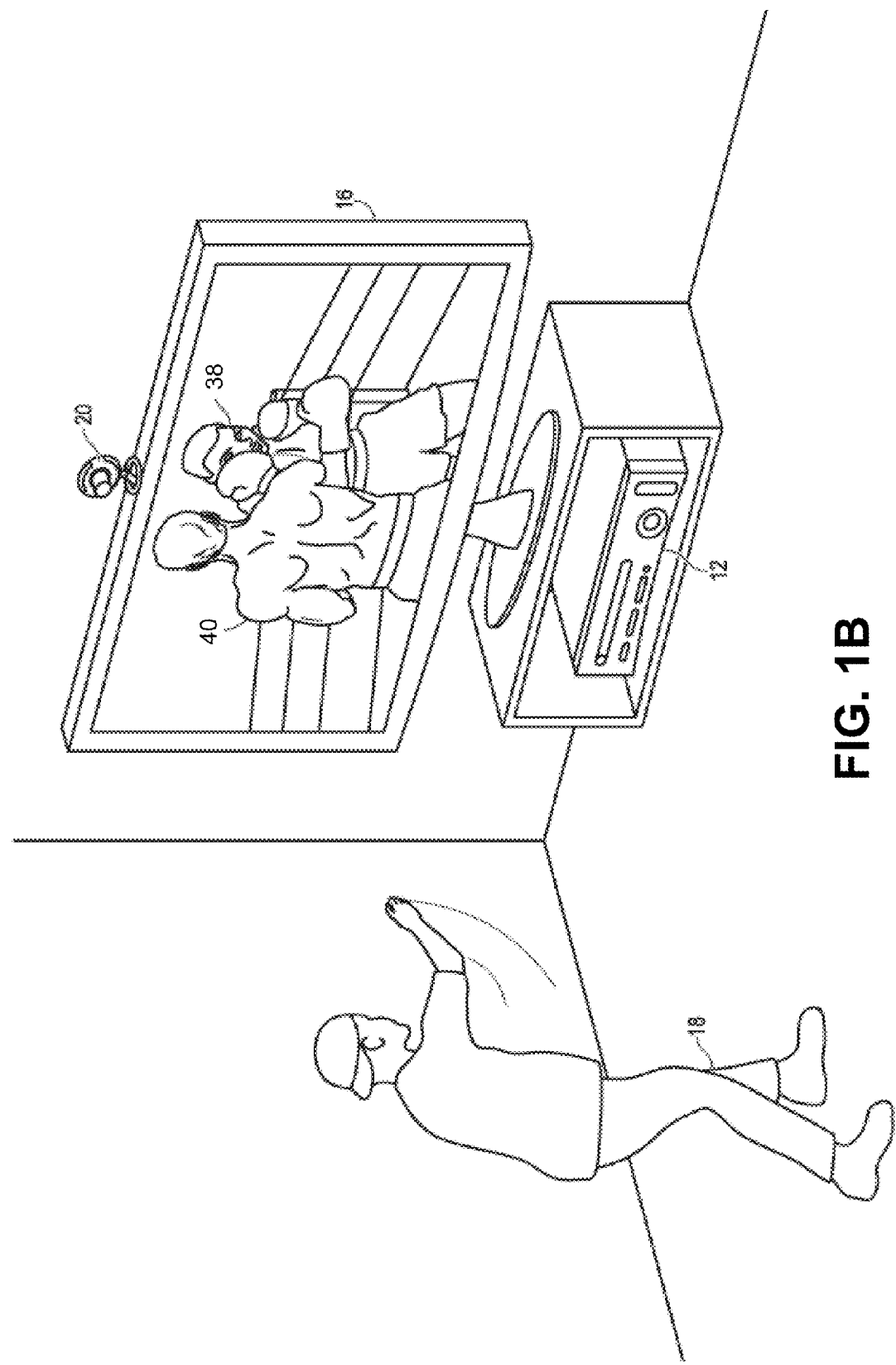

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for receiving a depth image of a scene, determining whether one or more pixels are associated with an environment of the depth image, discarding the one or more pixels associated with the environment from the depth image to isolate a desired object such as a human target in the depth image, processing the depth image with the isolated desired object, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within an application and/or animate an avatar or on-screen character.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a human target avatar 40 that the user 18 may control with his or her movements. For example, as shown in FIG. 1B, the user 18 may throw a punch in physical space to cause the human target avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the human target avatar 40 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the human target avatar 40. For example, the human target may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object. In such embodiments, the user of an electronic game may be holding the object such that the motions of the human target and the object may be used to adjust and/or control parameters of the game. For example, the motion of a human target holding a racket may be tracked and utilized for controlling an on-screen racket in an electronic sports game. In another example embodiment, the motion of a human target holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 20 to a particular location on the targets or objects.

According to another embodiment, the capture device 20 may include two or more physically separated cameras that may view a scene from different angles, to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving a depth image of a scene, determining whether one or more pixels associated with an environment of the depth image, discarding the one or more pixels associated with the environment from the depth image to isolate a desired object such as a human target in the depth image, processing the depth image with the isolated desired object, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
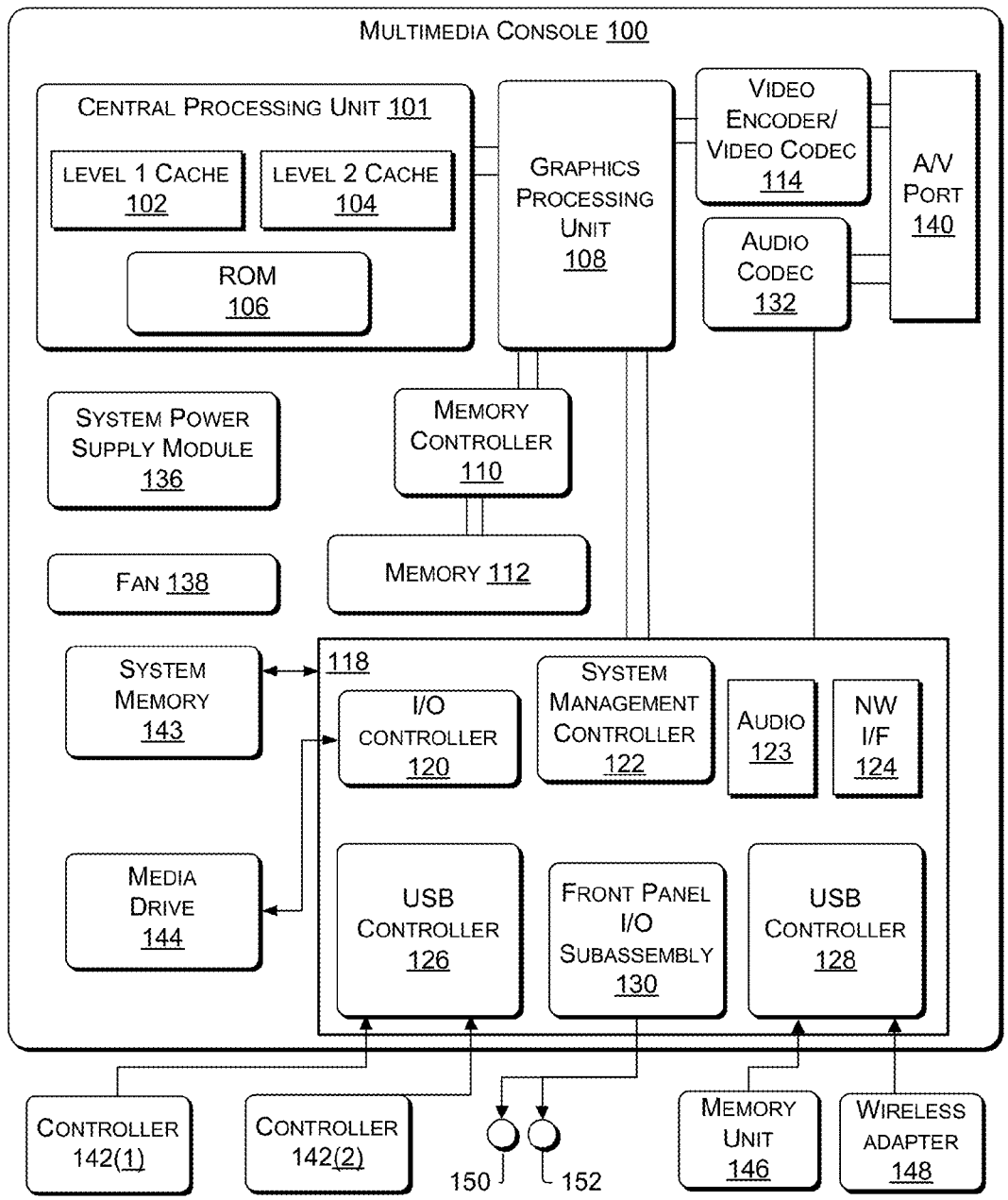
FIG. 3 illustrates an example embodiment of a computing environment that may be used to interpret one or more gestures in a target recognition, analysis, and tracking system.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio human target or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
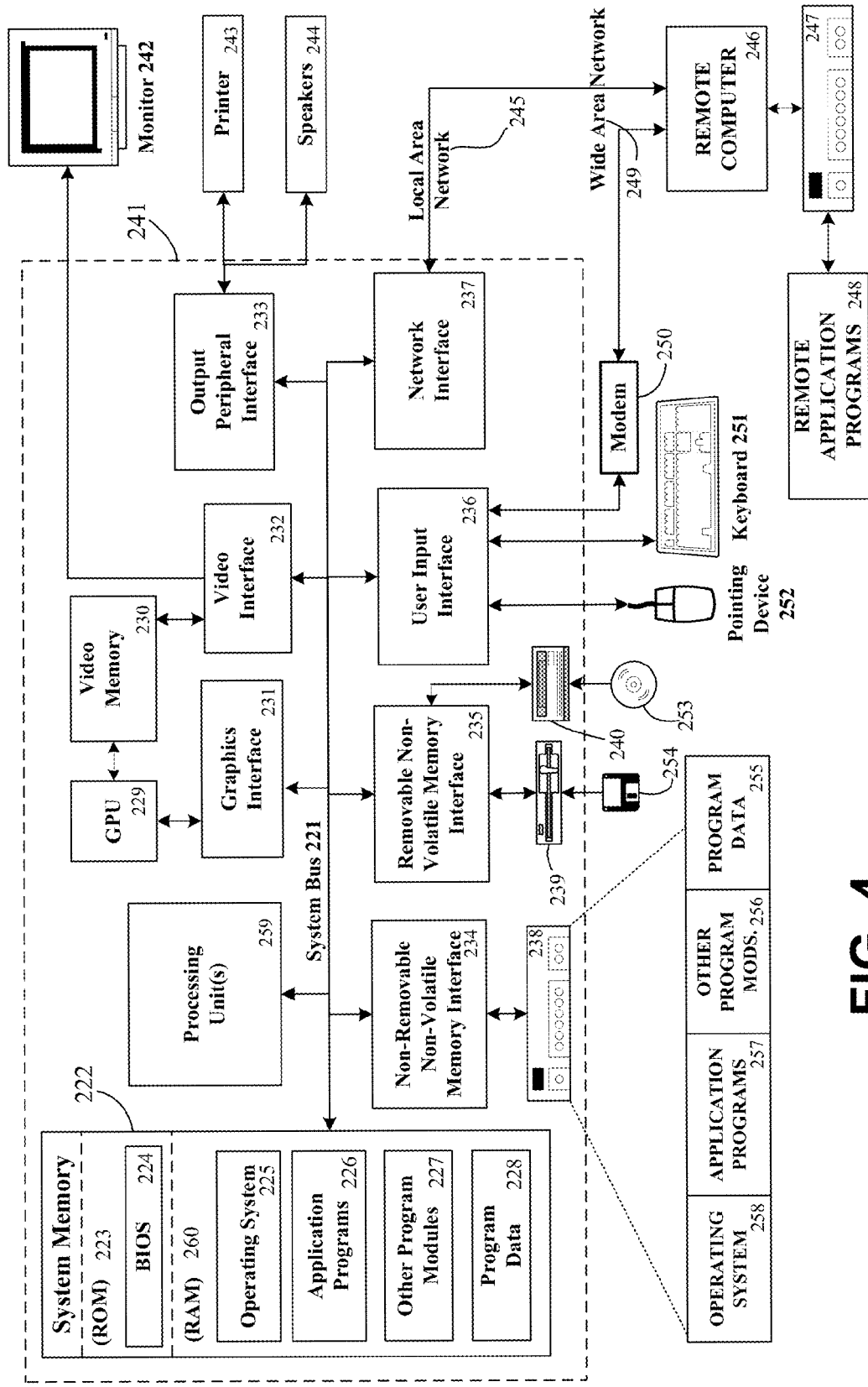
FIG. 4 illustrates another example embodiment of a computing environment that may be used to interpret one or more gestures in a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
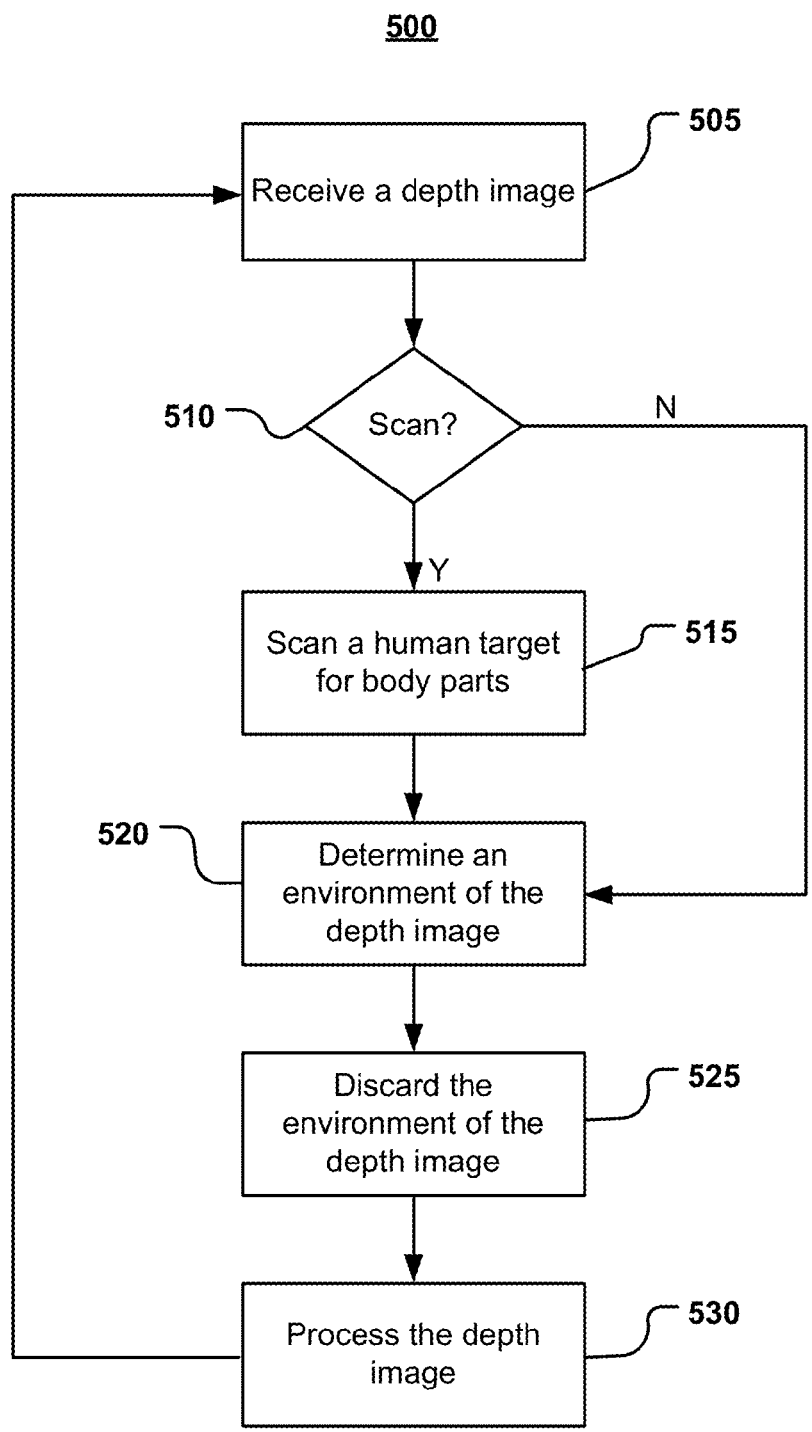
FIG. 5 depicts a flow diagram of an example method for segmenting a human target from an environment in a depth image.

FIG. 5 depicts a flow diagram of an example method 500 for processing depth information including, for example, segmenting a human target from an environment in depth image that may be captured by a capture device. The example method 500 may be implemented using, for example, the capture device 20 and/or the computing environment 12 of the target recognition, analysis, and tracking system 10 described with respect to FIGS. 1A-4. In an example embodiment, the example method 500 may take the form of program code (i.e., instructions) that may be executed by, for example, the capture device 20 and/or the computing environment 12 of the target recognition, analysis, and tracking system 10 described with respect to FIGS. 1A-4.

According to one embodiment, at 510, a depth image may be received. For example, the target recognition, analysis, and tracking system may include a capture device such as the capture device 20 described above with respect to FIGS. 1A-2. The capture device 20 may capture or observe a scene that may include one or more targets or objects. In an example embodiment, the capture device 20 may be a depth camera configured to obtain a depth image of the scene using any suitable technique such as time-of-flight analysis, structured light analysis, stereo vision analysis, or the like.

The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 6A:
FIG. 6A illustrates an example embodiment of a depth image that may be received.

FIG. 6A illustrates an example embodiment of a depth image 600 that may be received at 510. According to an example embodiment, the depth image 600 may be an image or frame of a scene captured by, for example, the 3-D camera 26 and/or the RGB camera 28 of the capture device 20 described above with respect to FIG. 2. As shown in FIG. 6A, the depth image 600 may include one or more human targets 602, 604 corresponding to, for example, one or more users such as the users 18 described above with respect to FIGS. 1A and 1B and one or more non-human targets 606 such as a wall, a table, a monitor, a couch, a ceiling or the like in the captured scene. According to an example embodiment, the one or more human targets 602, 604 may be players, or other objects that may be desired to be segmented or separated from an environment tin the depth image 600 and the one or more non-human targets 606 that may be the environment of the depth image 600.

As described above, the depth image 600 may include a plurality of observed pixels where each observed pixel has an observed depth value associated therewith. For example, the depth image 600 may include a two-dimensional (2-D) pixel area of the captured scene where each pixel in the 2-D pixel area may represent a depth value such as a length or distance in, for example, centimeters, millimeters, or the like of a target or object in the captured scene from the capture device 20. In one embodiment, the first depth image 600 may be colorized such that different colors of the pixels of the depth image correspond to and/or visually depict different distances of the one or more human targets 602, 604 and non-human targets 606 from the capture device 20. For example, according to one embodiment, the pixels associated with a target closest to the capture device may be colored with shades of red and/or orange in the depth image whereas the pixels associated with a target further away may be colored with shades of green and/or blue in the depth image.

Referring back to FIG. 5, in one embodiment, upon receiving the image, at 505, the image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth values may be filled in and/or reconstructed; and/or any other suitable processing may be performed on the received depth image such that the depth image may be processed to, for example, generate a model of a human target and track the model of the human target, which will be described in more detail below.

For example, in one embodiment, the target recognition, analysis, and tracking system may calculate portions of missing and/or removed depth values for pixels associated with infrared shadows in the depth image received at 505.

Figure 7:
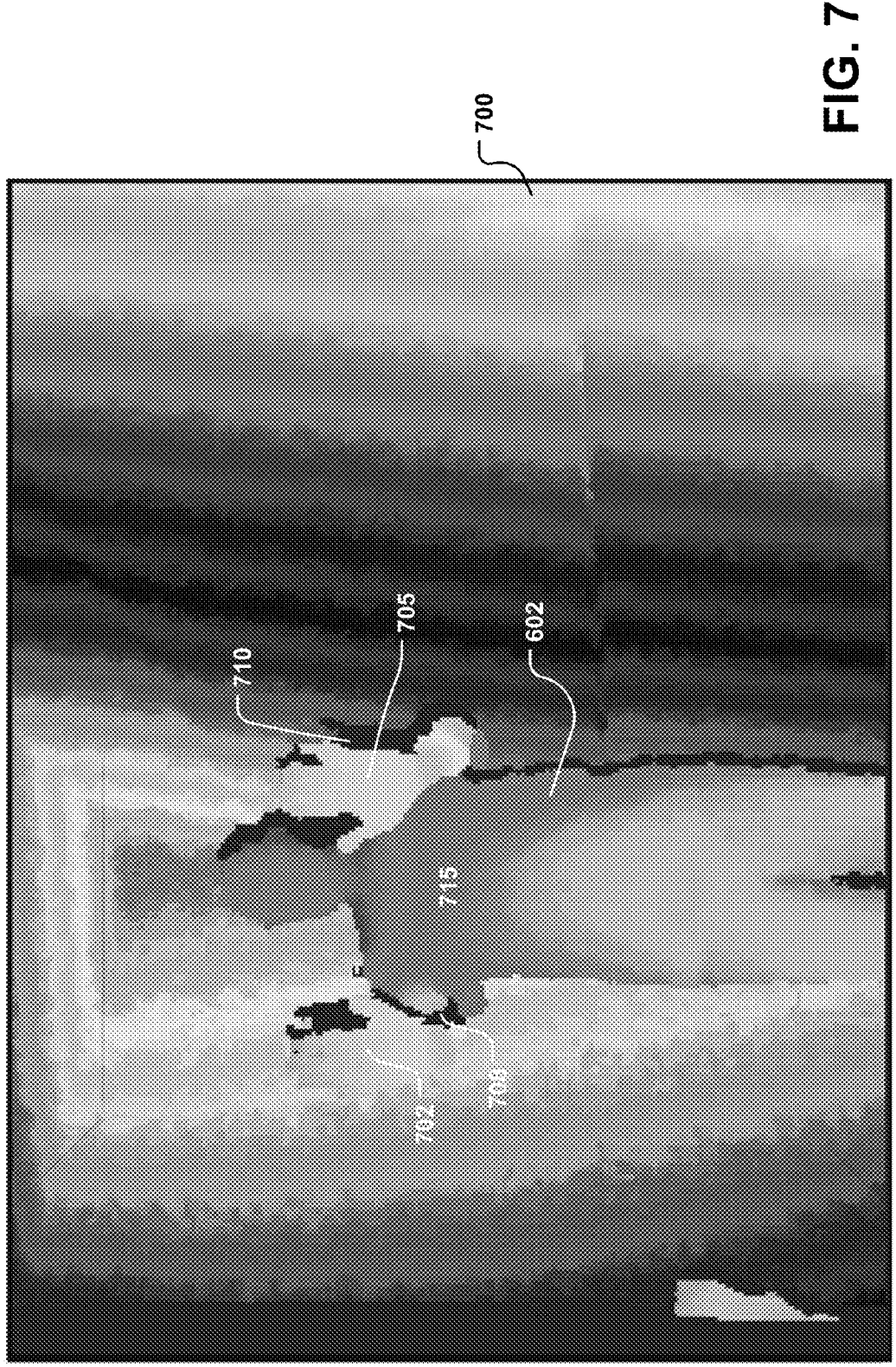
FIG. 7 illustrates an example embodiment of a depth image that may include an infrared shadow.

FIG. 7 illustrates an example embodiment of a depth image 700 that may include an infrared shadow. The depth image 700 may include a human target 602 associated with, for example, the user 18 described above with respect to FIGS. 1A and 1B. As shown in FIG. 7, a right hand 702 and a left hand 705 may be extended in front of a portion of the human target 602.

According to an example embodiment, the right hand 702 and the left hand 705 that may be extended in front of a portion of the human target 602 may generate respective first and second infrared shadows 708 and 710. The first and second infrared shadow 708 and 710 may include portions of the depth image 700 observed or captured by a capture device such as the capture device 20 described above with respect to FIGS. 1A-2 where a body part may cast a shadow on the scene. According to an example embodiment, the capture device may observe or capture an invalid depth value such as a depth value of zero for the pixels associated with the portions in the depth image where a body part may cast a shadow on the scene.

The first and second infrared shadows 708 and 710 may separate a body part from another body part of human target 602. For example, as shown in FIG. 7, the first infrared shadow 708 may separate the right hand 702 from, for example, the right arm of the human target 602. According to an example embodiment, the first and second infrared shadows 708 and 710 may separate body parts with invalid depth values. For example, the pixels associated with the portions of first and second infrared shadows 708 and 710 may have an invalid depth value. The invalid depth values may separate a body part such as the right hand 702 from, for example, a right arm of the human target 602 that may have pixels with valid, non-zero depth value.

In one embodiment, depth values of the pixels associated with an infrared shadow such as the infrared shadow 708 may be replaced. For example, the target recognition, analysis, and tracking system may estimate one or more depth values for the shadow that may replace the invalid depth values. According to one embodiment, the depth value for an infrared shadow pixel may be estimated based on neighboring non-shadow pixels. For example, the target recognition, analysis, and tracking system may identify an infrared shadow pixel. Upon identifying the infrared shadow pixel, the target recognition, analysis, and tracking system may determine whether one or more pixels adjacent to the infrared shadow pixel may have valid depth values. If one or more pixels adjacent to the infrared shadow pixel may have valid depth values, a depth value for the infrared shadow pixel may be generated based on the valid depth values of the adjacent pixels. For example, in one embodiment, the target recognition, analysis, and tracking system may estimate or interpolate valid depth values of pixels adjacent to the shadow pixel. The target recognition, analysis, and tracking system may also assign the shadow pixel a depth value of one of the adjacent pixels that may have a valid depth value.

According to one embodiment, the target recognition, analysis, and tracking system may identify other infrared shadow pixels and calculate depth values for those pixels as described above until each of the infrared shadow pixels may have a depth value associated therewith. Thus, in an example embodiment, the target recognition, analysis, and tracking system may interpolate a value for each of the infrared shadow pixels based on neighboring or adjacent pixels that may have a valid depth value associated therewith.

Additionally, in another example embodiment, the target recognition, analysis, and tracking system may calculate depth values for one or more infrared shadow pixels based on the depth image of a previous frame. As described above, the capture device such as the capture device 20 described above with respect to FIGS. 1A-2 may capture a scene in frames. Each frame may include a depth image. For example, the system may determine whether the corresponding pixel of a previous frame has a valid depth value. Based on the determination, the system may replace the depth value of the infrared shadow pixel in present depth image with the depth value of the corresponding pixel of the previous frame.

At 515, a human target in a depth image may be scanned for one or more body parts. For example, upon receiving a depth image, the target recognition, analysis, and tracking system may determine whether the depth image includes a human target such as the human targets 602 and 604 described above with respect to FIG. 6A corresponding to, for example, a user such as the user 18, described above with respect to FIGS. 1A and 1B. In one embodiment, to determine whether the depth image includes a human target, the target recognition, analysis, and tracking system may flood fill each target or object in the depth image and may compare each flood filled target or object to a pattern associated with a body model of a human in various positions or poses. The flood filled target, or the human target, that matches the pattern may then be scanned to determine values including, for example, locations and/or measurements such as length, width, or the like associated with one or more body parts. For example, the flood filled target, or the human target, that matches the pattern may be isolated and a mask such as a binary mask of the human target may be created. The mask may be created by, for example, flood filling the human target such that the human target may be separated from other targets or objects in the scene elements. The mask may then be analyzed to determine the locations and/or measurements for one or more body parts. According to one embodiment, a model such as a skeletal model, a mesh human model, or the like of the human target may be generated based on the locations and/or measurements for the one or more body parts.

In one embodiment, the target recognition, analysis, and tracking system may determine whether a human target in the depth image may have been previously scanned, at 510, before the human target may be scanned at 515. For example, the capture device such as the capture device 20 described above with respect to FIGS. 1A-2 may capture a scene in frames. Each frame may include a depth image. The depth image of each frame may be analyzed to determine whether the depth image may include a human target as described above. The depth image of each frame may further be analyzed to determine whether the human target may have been previously scanned for one or more body parts. For example, at 510, the target recognition, analysis, and tracking system may determine whether a human target in the depth image received, at 505, corresponds to a human target previously scanned at 515. In one embodiment, at 510, if the human target may not correspond to a human target previously scanned, the human target may then be scanned at 515. Thus, according to an example embodiment, a human target may be scanned once in an initial frame and initial depth image captured by the capture device that includes the human target. According to another embodiment, the target recognition, analysis, and tracking system may scan the human target for one or more body parts in each received depth image that includes the human target. The scan results associated with, for example, the measurements for the one or more body parts may then be averaged.

At 520, an environment of the depth image may be determined. For example, as described above, the depth image may be a plurality of observed pixels in a two-dimensional (2-D) pixel area where each observed pixel has an observed depth value. In one embodiment, the target recognition, analysis, and tracking system may determine whether one or more of the pixels in the depth image may be associated with the human target or environment of the depth image. As described above, the environment of the depth image may include, for example, environment objects behind a human target, environment objects above a human target, environment objects surrounding a left and a right side of a human target, environment objects in front of a human target, or the like in the depth image.

In an example embodiment, the target recognition, analysis, and tracking system may determine the environment of the depth image by initially defining a bounding box around each foreground object such as each human target in the depth image received at 505. For example, the target recognition, analysis, and tracking system may define a bounding box for each human target such as the human targets 602, 604 described above with respect to FIG. 6A in the received depth image. According to an example embodiment, the bounding box may be defined based on a centroid and/or body measurement associated with the human target. For example, as described above, at 515, the target recognition, analysis, and tracking system may scan a human target in a received depth image for one or more body parts. The bounding box may be defined by the centroid and/or measurements determined based on, for example, the scan at 515. After defining the bounding box for each human target, the pixels in the depth image outside the bounding box may be identified as environment.

FIG. 8 illustrates an example embodiment of a depth image 800 with a bounding box 802 defined around a human target. As shown in FIG. 8, the bounding box 802 may be defined by a first side 804a, a second side 804b, a third side 804c, and a fourth side 804d. In one embodiment, the first, second, third, and fourth sides 804a-804d of the bounding box 702 may be calculated based on a centroid and/or one or more body measurements of the human target 602. In one embodiment, the centroid of the human target 602 may be calculated based on the scan described above. For example, the centroid may be a representation of a joint or node of, for example, geometric center of the human target. According to an example embodiment, one or more body parts determined by the scan may be used to calculate the centroid. For example, coordinates of every pixel in a depth image having a threshold probability that the pixel may be associated with a body part may be averaged to calculate the centroid. Alternatively, the centroid may be determined based on a linear regression of the measurements and/or locations of a body part determined by the scan.

The body measurements such as the length, width, or the like associated with one or more body parts and the calculated centroid may then be used to determine the sides of the bounding box 802. For example, the bounding box 802 may be defined by the intersection of the respective first, second, third, and fourth sides 804a-804d. According to an example embodiment, the location of the first side 804a and the third side 804c may be determined by adding the measurements such as the length associated with the respective left and right arms determined by the scan to an X value associated with the centroid in a direction of the left arm and a direction of the right arm. Additionally, in one embodiment, the location second side 804b and the fourth side 804d may be determined based on the Y value associated with the location of the top of the head of the human target and the bottom of the legs determined by on the scan. The bounding box 802 may then be defined by the intersection of, for example, the first side 804a and the second side 804b, the first side 804a and the fourth side 804d, the third side 804c and the second side 804b, and the third side 804c and the fourth side 804d.

According to an example embodiment, after defining the bounding box for the human target 602, the pixels in the depth image 800 outside the bounding box 802 may be identified as the non-human target pixel, or the pixels associated with the environment, of the depth image 800.

Referring back to FIG. 5, in one embodiment, the target recognition, analysis, and tracking system may further determine the environment of a depth image by flood filling one or more pixels associated with the a human target such as the human target at 520. For example, the target recognition, analysis, and tracking system may detect edges of, for example, the foreground object such as the human target by comparing various depth values of nearby pixels such that the pixels within the edges of the human target may be flood filled.

According to an example embodiment, the target recognition, analysis, and tracking system may detect edges of the foreground object such as the human target by comparing various depth values of nearby pixels that may be within the bounding box such as the bounding box 802 described above with respect to FIG. 8. For example, as described above, a bounding box may be defined around the human target. The pixels outside the bounding box may be identified as the environment of the depth image. The target analysis, recognition, and tracking system may then analyze the pixels within the bounding box to determine whether a pixel may be associated with the human target or the environment such that the edges of the foreground object may be detected.

In one embodiment, the target recognition, analysis, and tracking system may further select a predetermined number of sample points as starting points to analyze the pixels within the bounding box to determine whether the pixel may be associated with the human target or the environment. For example, the target recognition, analysis, and tracking system may randomly select one or more sample points within the bounding box. In one embodiment, the pixels associated with the randomly selected sample points may be reference pixels that may be used to initially compare pixels to detect edges of the foreground object such as the human target, which will be described in more detail below.

Figure 9A:
FIG. 9A illustrates an example embodiment of a depth image with a body part of a human target isolated.
Figure 9B:
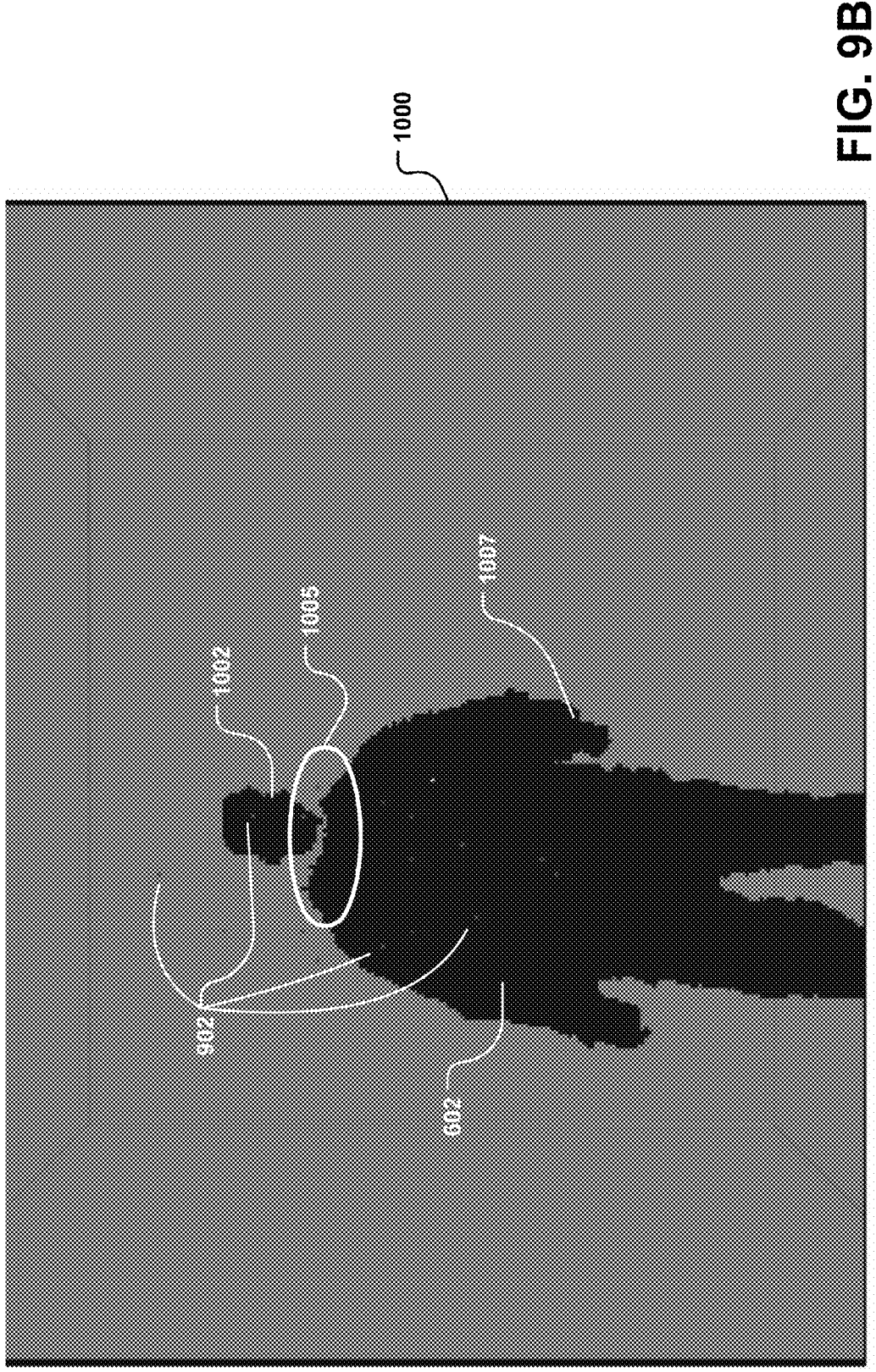
FIG. 9B illustrates an example embodiment of the depth image of FIG. 9A with the human target segmented from an environment.

FIG. 9B illustrate an example embodiment of a depth image 1000 that may have one or more separated body parts and a predefined number of sample points 902 selected within, for example, a bounding box. In an example embodiment, the sample points 902 may be selected based on the centroid of the human target 602. For example, as shown in FIG. 9B, the target recognition, analysis, and tracking system may randomly select, for example, the sample points 902. The sample points 902 may include 16 sample points that may be at various locations that surround the centroid of the human target 602.

According to another embodiment, the various locations of the sample points 902 may be randomly selected using, for example, a shape. For example, a shape such as a diamond shape may be used to randomly select the sample points 902. The various locations along, for example, the shape such as the diamond shape may be selected as the sample points 902.

Additionally, the various locations of the sample points 902 may be based on, for example, one or more body parts of the human target 602 determined by the scan. For example, the various locations of the sample points 902 may be selected based on the shoulder width, the body length, the arm length, or the like of the human target. Additionally, the sample points 902 may be selected to cover, for example, the upper body, the lower body, or a combination of the upper and lower body of the human target 602.

Referring back to FIG. 5, the target recognition, analysis, and tracking system may detect the edges of a human target such as the human targets 602, 604 described above with respect to FIGS. 6A and 9 at 520. According to an example embodiment, the target recognition, analysis, and tracking system may detect the edges of a human target by analyzing various pixels within, for example, the bounding box using a predetermined edge tolerance. As described above, in one embodiment, the target recognition, analysis, and tracking system may select a predetermined number of sample points as starting points to detect the edges of the human target using the predetermined edge tolerance. Using the pixels associated with the sample points as an initial reference, the edges may be determined by comparing various depth values associated with adjacent or nearby pixels of pixels to detect the edges of the human target. Thus, according to an example embodiment, each pixel starting with, for example, the pixels associated with the sample points may be compared to adjacent or nearby pixels to detect an edge of the human target using the predetermined edge or dynamically calculated edge tolerance.

According to an example embodiment, if the various depth values being compared may be greater than a predetermined edge tolerance, the pixels may define an edge. In one embodiment, the predetermined edge tolerance may be, for example, 100 millimeters. If a pixel representing a depth value of 1000 millimeters may be compared with an adjacent pixel representing a depth value of 1200 millimeters, the pixels may define an edge of a human target such as the human targets 602, 604, because the difference in the length or distance between the pixels may be greater than the predetermined edge tolerance of 100 mm.

According to an example embodiment, the edge tolerance value may vary between pixels. For example, for pixels in front of a chest of the human target, a higher tolerance value may be used to detect the edge of the human target. For example, the human target may hold his/her arms in front of the his/her chest. To accurately detect the edges of the hands of the human target 602, the target recognition, analysis, and tracking system may use a higher tolerance value. In another example, the human targets may extend his/her arms away from his/her torso. In this example, the target recognition, analysis, and tracking system may use a lower tolerance value to detect the edges of the human target's hands. According to one embodiment, the variable edge tolerance may be determined based on, for example, a location of the pixel, a length of an arm of the human target, and/or a width of the shoulder of the human target. According to another example embodiment, the variable edge tolerance may be interpolated such that the detected edge may be a smooth curve.

In one embodiment, the pixels within the detected edges of the human targets may be flood filled to isolate and/or identify the human target such as the human targets 602, 604. The pixels that may not be flood filled may then be identified or associated with the environment of the depth image such that the pixels may be removed, which will be described in more detail below.

According to an example embodiment, one body part of the human target 602 may be separated from another body part of the human body. For example, as described above with respect to FIG. 7, an infrared shadow may be cast by a body part such that the body part may be separated from another body part of the human target. In another example embodiment, a body part such as a head may be separated from a torso of the human target by, for example, facial hair, various articles of clothing, or the like.

Additionally, as described above, the body parts that may be separated by, for example, facial hair, various articles of clothing, or the like by invalid depth values. For example, the capture device such as the capture device 20 described above with respect to FIGS. 1A-2 may capture or observe an invalid depth value such as a zero or an invalid depth value for one or more pixels associated with facial hair, various articles of clothing, or the like. As described above, in one embodiment, the target recognition, analysis, and tracking system may estimate valid depth values for one or more of the pixels associated with facial hair, various articles of clothing, or the. After estimating valid depth values, the body parts may still be separated. For example, the target recognition, analysis, and tracking system may not be able to estimate a valid depth value for each of the pixels of the facial hair, various articles of clothing, or the like. According to an example embodiment, the target recognition, analysis, and tracking system may determine the environment of the depth image with the invalid depth values for those pixels.

FIGS. 9A-9B illustrate an example embodiment of a depth image 1000 that may have one or more separated body parts. As shown in FIG. 9A, the depth image 1000 may include the human target 602. In an example embodiment, the human target 602 may have a head 1002, a beard 1005, and a torso 1007. As shown in FIG. 9A, the head 1002 may be separated from the torso 1007 by the beard 1005. According to an example embodiment, the target recognition, analysis, and tracking system may use multi-sample flood filling with randomly selected sample points as described above to identify and flood fill one or more isolated body parts such as the head 1002 of the human target 602.

As shown in FIG. 9B, both the head 1002 and the torso 1007 may be flood filled as pixels associated with the human target 602, despite the beard 1005 separating the head 1002 from the torso 1007. For example, as described above, the target recognition, analysis, and tracking system may randomly generate a predefined number of sample points 802 in, for example, diamond shape around a centroid of the human target 602. As shown in FIG. 9B, three of the sample points 902 may be associated with pixels of the head 1002. In view of these three sample points, the target recognition, analysis, and tracking system may determine that the pixels associated with head 1002 belong to the head of the human target 602, and accordingly, flood fill the isolated head 1002 as target pixels.

As described above, each sample point may serve as the starting points to determine whether pixels are associated with a human target such that the human target may be flood filled. For example, the target recognition, analysis, and tracking system may start flood filling at a first sample point that may be the centroid of a human target 602. Thereafter, the target recognition, analysis, and tracking system may pick a second sample point to determine whether pixels are associated with the human target 602.

In an example embodiment, the target recognition, analysis, and tracking system may examine the depth value of the each of the sample points. For example, if the depth value of the second sample point may be close or within a predetermined tolerance to the depth value of the centroid of the human target 602, the target recognition, analysis, and tracking system may identify the sample point as being associated with an isolated body part of the human target 602. As described above, according to one example embodiment, the predefined tolerance may be determined based on values including, but not limited to, locations and/or measurements such as length, width, or the like associated with one or more body parts. Thus, according to an example embodiment, the target recognition, analysis, and tracking system may use the sample points as starting points to determine whether pixels are associated with a human target such that the pixels may be flood filled.

Referring back to FIG. 5, at 520, the target recognition, analysis, and tracking system may use depth history data to determine the environment or the non-human target pixels of the depth image. For example, the target recognition, analysis, and tracking system may determine whether a pixel may be associated with a human target by flood filling as described above. If the pixel may not be associated with the human target based on flood filling, the target recognition, analysis, and tracking system may discard the pixel as part of the environment. If the pixel appears to be a pixel associated with the human target, the target recognition, analysis, and tracking system may analyze the pixel with respect to depth history data, including, for example, the historical maximum depth value of the pixel, average or standard deviation. For example, as described above, the capture device such as the capture device 20 described above with respect to FIGS. 1A-2 may capture a scene in frames. Each frame may include a depth image. The depth image of each frame such as the depth image 600 as shown in FIG. 6A may be analyzed to extract and/or store a historical maximum depth value for each pixel therein.

Figure 10:
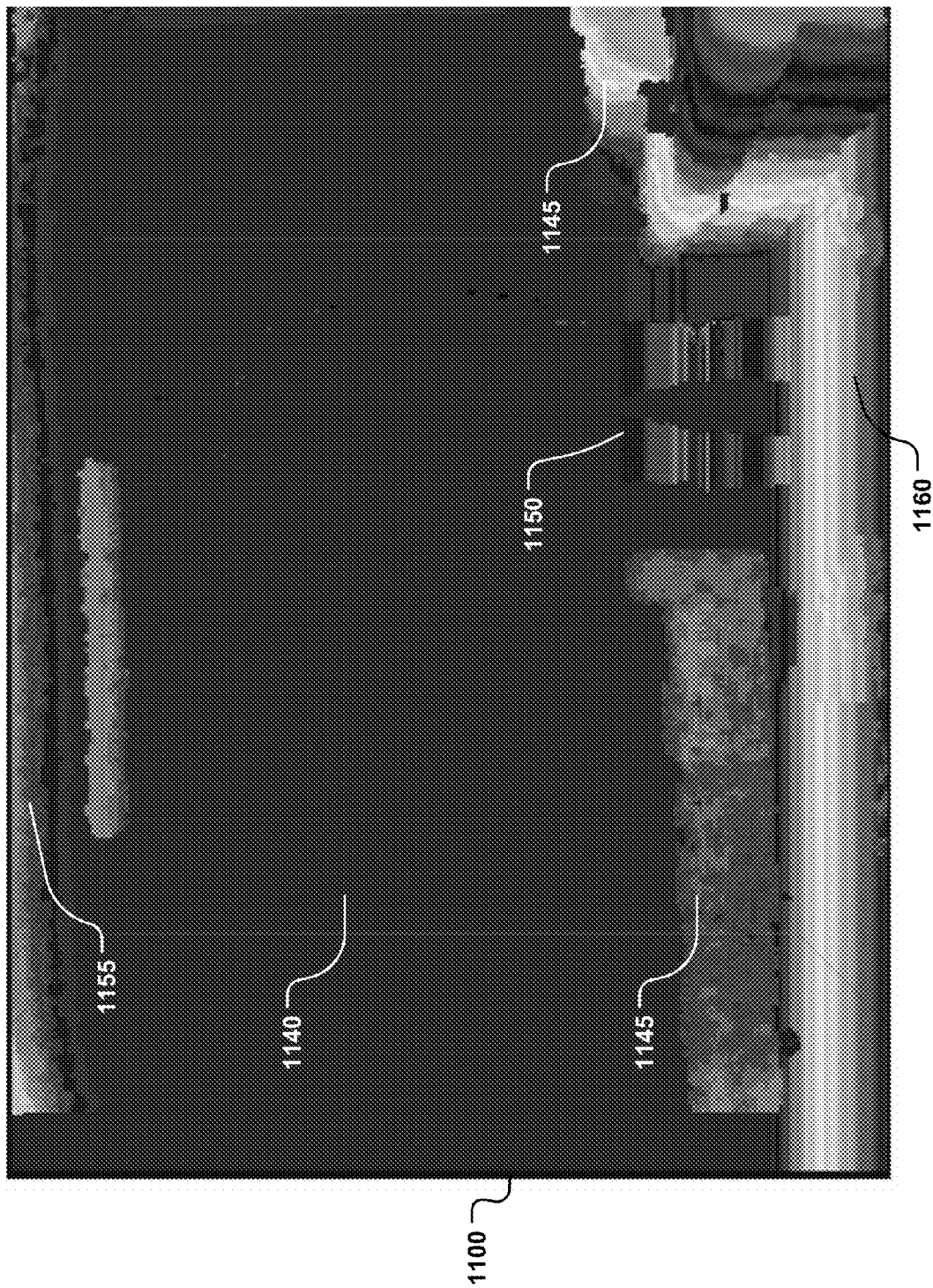
FIG. 10 illustrates an example embodiment of depth history data associated with depth images.

FIG. 10 depicts an example embodiment of depth history data 1100. The maximum depth values may be representations of a distance of, for example, a wall 1140, a couch 1145, an estimated depth value behind a leg 1150, a ceiling 1155, a floor 1160, or any other objects that may be captured by the capture device 20. According to an example embodiment, the depth history data may capture depth values of one or more objects associated with the environment of the depth image. Thus, in one embodiment, the depth history data may capture or observe depth values of the environment as if capturing a scene with human targets 602 removed from the view of the capture device 20.

Figure 11A:
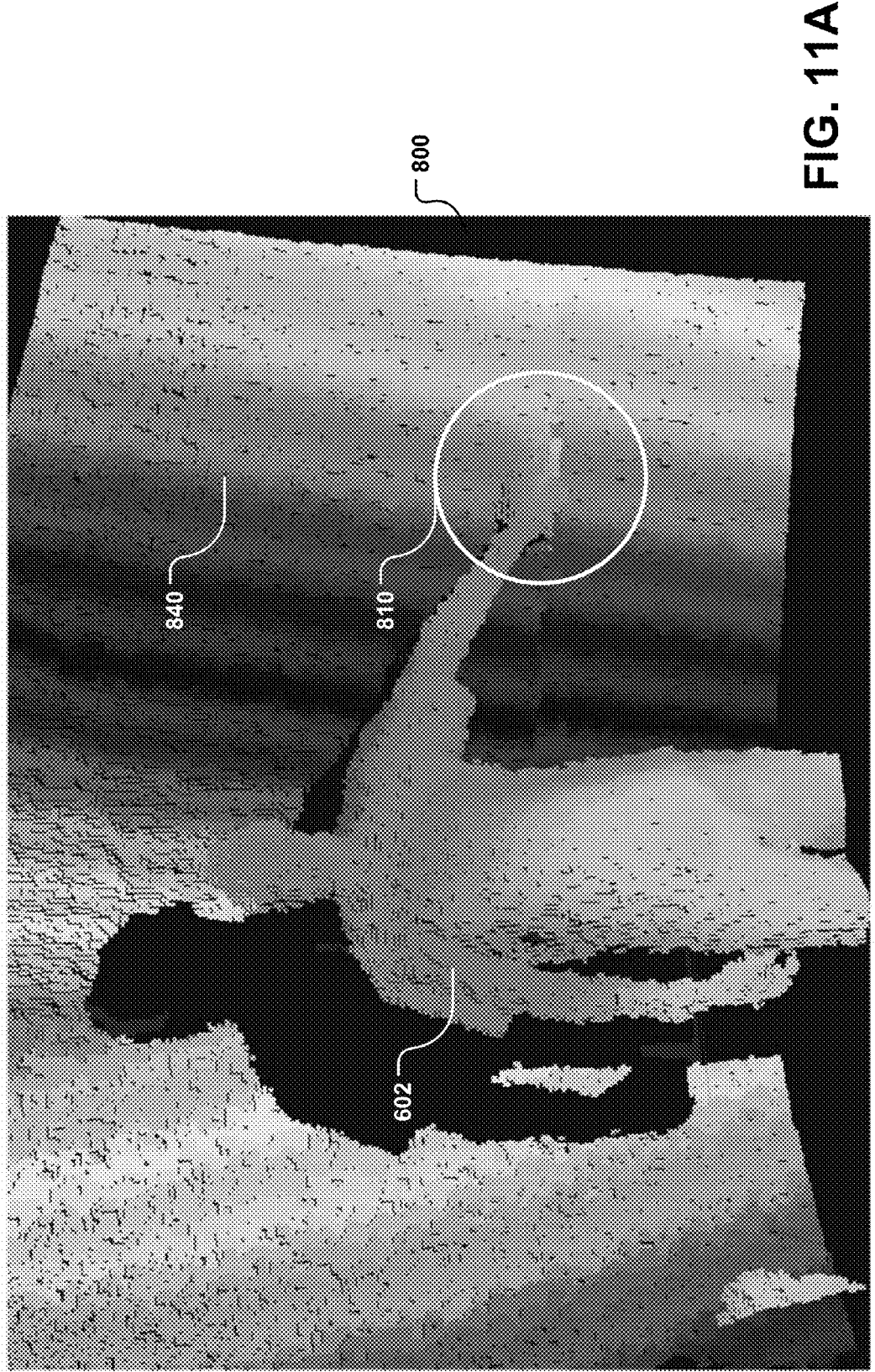
FIG. 11A depicts an example embodiment of a depth image that may be captured.

According to one embodiment, the maximum depth value of a pixel in depth history data may be estimated. For example, as shown in FIG. 11A, a user such as the user 18 described above with respect to FIG. 1A-2 may stand in front of a wall. The target recognition, analysis, and tracking may capture or observe the human target 602 in the depth image 800 that may be associated with the user 18. The target recognition, analysis, and tracking system may scan the human target 602 as described above to find the location of the human target. The target recognition, analysis, and tracking system may then estimate the depth values of the pixels associated with the wall behind the location of the human target 602 determined by the scan such that the estimated depth values may be included in the depth history data. For example, the target recognition, analysis, and tracking system may record and/or store the depth value of the wall 840 captured by the capture device 20 as the maximum depth values of the pixels associated the wall. The target recognition, analysis, and tracking system may then estimate the depth values wall pixels covered by human target 602 based on the depth values of one or more surrounding pixels associated with the wall. Thus, according to an example embodiment, the target recognition, analysis, and tracking system may gather and/or analyze information such as depth values of one or more objects surrounding human target 602 to accurately remove the environment of a depth image.

According to one embodiment, the maximum depth values in the depth history data may be updated as the capture device such as the capture device 20 observes or captures depth images from frame to frame. For example, in a first frame, the depth image may capture a human target 602 on the left half of the frame, and environment objects on the right half of the frame may be exposed to the camera. The maximum depth values in the depth history data may be updated to reflect the depth values of pixels associated with environment objects on the right side of the frame. For example, when the human target 602 moves to the right half of the frame, environment objects on the left hand side of the frame may be exposed to the capture device 20. The maximum depth values in the depth history data may be updated to reflect the depth values of pixels associated with environment objects on the left half of the camera view. In other words, as the human target moves from frame to frame, a environment object may be visible to the capture device such that the depth history data may be updated to reflect the depth values of pixels associated with the environment object.

In example embodiments, the target recognition, analysis, and tracking system may update the maximum depth values for a subset of pixels in each frame. For example, a frame may include a predefined number of scan lines scan lines or the like. In one embodiment, the target recognition, analysis, and tracking system may update the maximum depth values for pixels on one horizontal scan line per frame in an top to bottom direction, by temporal averaging or other suitable mechanism of updating the history pixels over multiple frames. In other embodiments, the system may update the maximum depth values of pixels, in a bottom to top direction, or update one vertical scan line per frame, in a left to right direction, or in a right to left direction, or the like. Accordingly, the maximum depth values of a frame may be updated gradually to keep to track of objects in the camera view.

According to an example embodiment, a depth value of the pixel being examined may be compared to the maximum depth value of the pixel based on the depth history data. For example, if the pixel being exampled may have the same depth value as the historical maximum depth value of the pixel, the target recognition, analysis, and tracking system may determine that the pixel may be associated with the environment of the depth image. Alternatively, in one embodiment, if the depth value of the pixel being examined may be less than the historical maximum depth value of the pixel within, for example, a predetermined tolerance value described above, the target recognition, analysis, and tracking system may determine that the pixel may be associated with a foreground object such as the human target and the pixel may then be flood filled. Thus, according to an example embodiment, the depth history data may be used to confirm that a pixel may be associated with a human target.

FIG. 11A depicts an example embodiment of a depth image that may be captured. The depth image may include a human target 602 touching a wall 840. According to an example embodiment, the hand of the human target 602 and the wall 840 may have the similar depth values as shown in the area within a portion 810 of the depth image. In an example embodiment, if the difference depth values between the hand and the wall 840 may be small enough, or less that a predetermined tolerance, the target recognition, analysis, and tracking may not be able to detect an edge of the hand. Thus, in an example, embodiment, the target recognition, analysis, and tracking may use the depth history data to determine whether a pixel in the portion 810 may be associated with the environment or the human target 602.

Figure 11B:
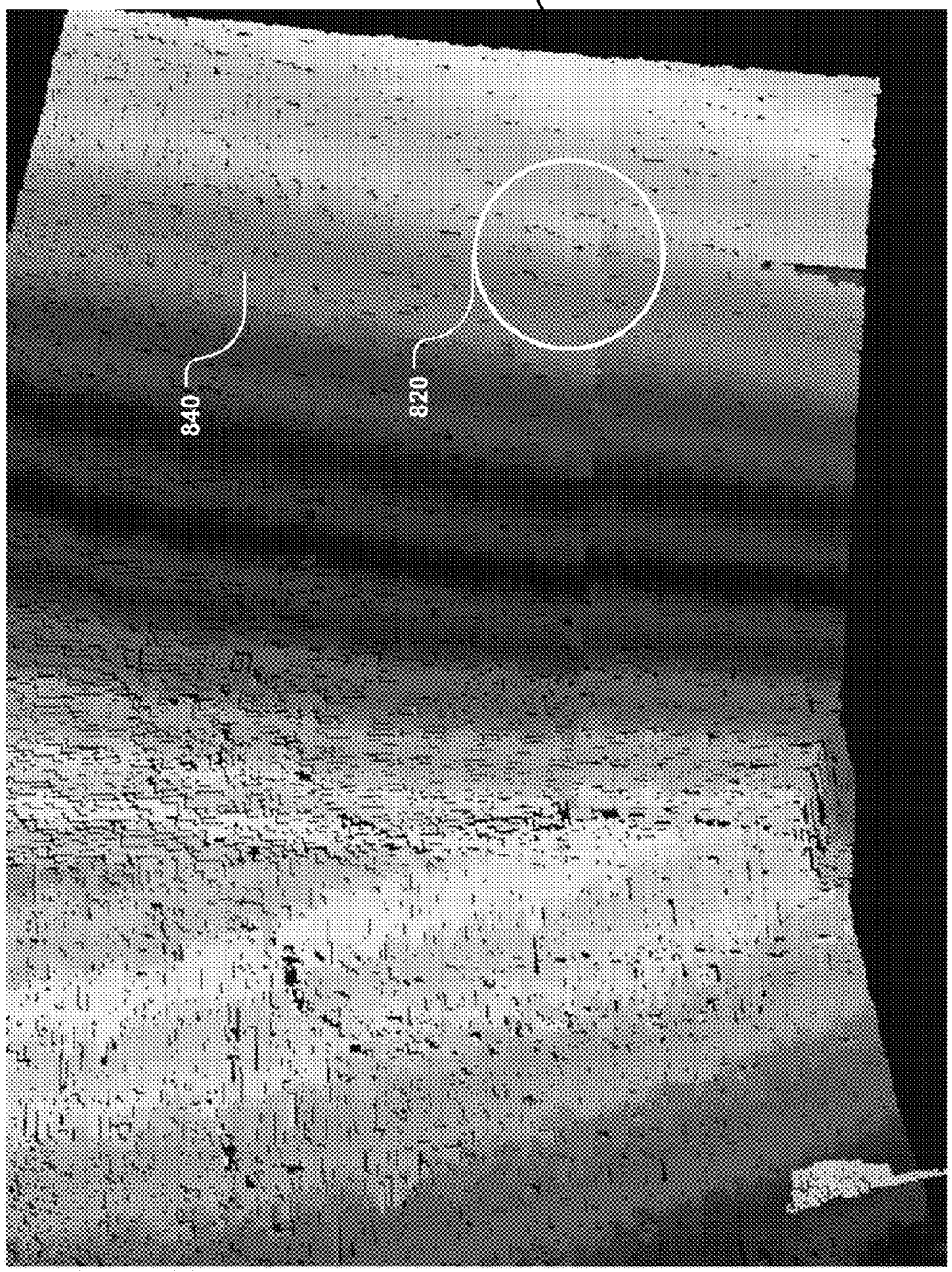
FIG. 11B illustrates an example embodiment of depth history data including maximum depth values accumulated over time.
Figure 11C:
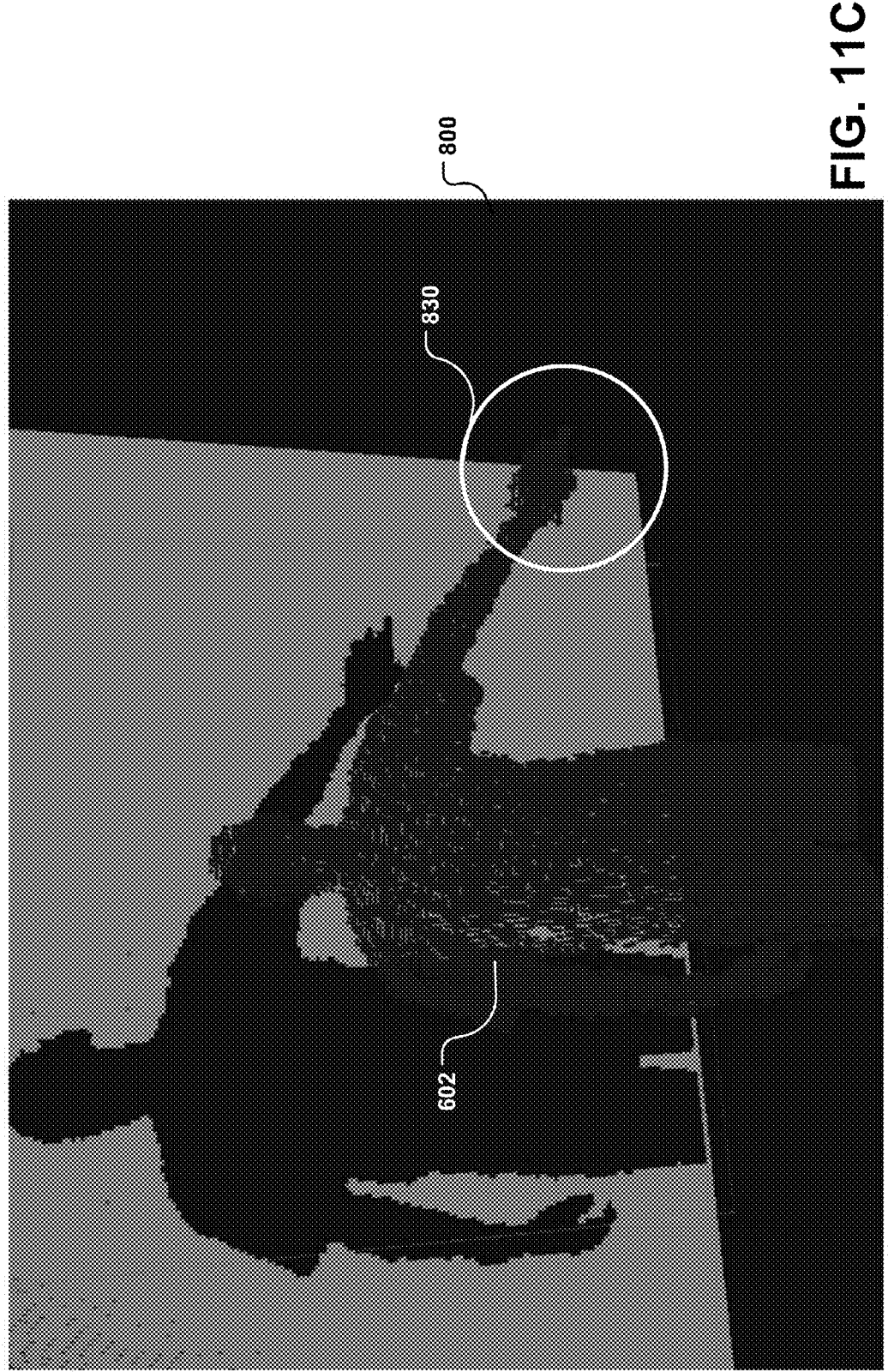
FIG. 11C illustrates an example embodiment of a depth image with a human target segmented from an environment.

FIG. 11B depicts an example embodiment of depth history data that may include maximum depth values accumulated over a number of frames. As discussed above, depth history data may provide an estimate of the depth values of the environment surrounding the human target. As shown in FIG. 11B, the depth history data may include depth values of the pixels associated with a wall 840. For example, the area within a portion 820 may capture the depth values of pixels associated with the wall 840, which may be covered by the hand of the human target 602 in the depth image 800 in FIG. 11A. According to one embodiment, the target recognition, analysis, and tracking system may compare a depth value of a pixel within the portion 810 of FIG. 11A with a maximum depth value in the depth history data of a corresponding pixel in a portion 820 of FIG. 11B. If the depth value of the pixel in the portion 810 may have the same value as the historical maximum depth value of the pixel in the portion 820, the target recognition, analysis, and tracking system may determine that the pixel may be associated with the wall 840. The pixels in the portion 810 associated with the wall 840 may then be discarded as the environment as shown in FIG. 11C.

Alternatively, if the depth value of a pixel in the portion 810 may be less than the historical maximum depth value of the pixel in the portion 1020, the target recognition, analysis, and tracking system may determine that the pixel may be associated with the human target 602 such that the pixel may be flood filled.

According to one embodiment, the target, recognition, analysis, and tracking system may check the depth history data when an edge having a small predetermined tolerance value may be detected. For example, the target, recognition, analysis, and tracking system may determine whether the depth difference between two pixels that may define an edge may be within a predetermined tolerance value. If the depth difference may be less than the predetermined value, the target, recognition, analysis, and tracking system may proceed to access the depth history data. In an example embodiment, the tolerance value may be predetermined based on noise in the depth image received, captured, or observed by the capture device such as the capture device 20 shown in FIGS. 1A-2. The tolerance value may also vary depending on the type of capture devices, the depth values, or the like. That is, according to one embodiment, the tolerance value may be larger or smaller as the depth value of a pixel increases.

The depth history data may further include floor pixels. For example, the difference between dept values associated with feet of a human target such as the human target 602 and the floor may be within a small predetermined tolerance or value similar to when a hand of the human target may touch a wall as described above. The target, recognition, analysis, and tracking the system may further track the depth values of pixels associated with the floor in depth history data. For example, the depth values of the floor may be detected and stored or recorded into the depth history data. When examining a pixel in the floor area, the target, recognition, analysis, and tracking system may compare the depth value of the pixel being examined with the corresponding floor pixel in depth history data.

Referring back to FIG. 5, at 525, the environment of the depth image may be removed or discarded. For example, upon flood filling the pixels associated with the human target by determining whether pixels may be associated with the human target as described above, the target recognition, analysis and tracking system may discard the pixels that may not be associated with the flood filled human target. Thus, in one embodiment, at 525, the target recognition analysis and tracking system may discard or remove the pixels associated with the environment of the depth image based on the flood filled human target such that the human target including the pixels and depth values associated therewith may be isolated in the depth image. According to an example embodiment, the target recognition, analysis, and tracking system may discard the pixels associated with the environment by assigning them, for example, an invalid depth value such as a depth value of zero.

Figure 6B:
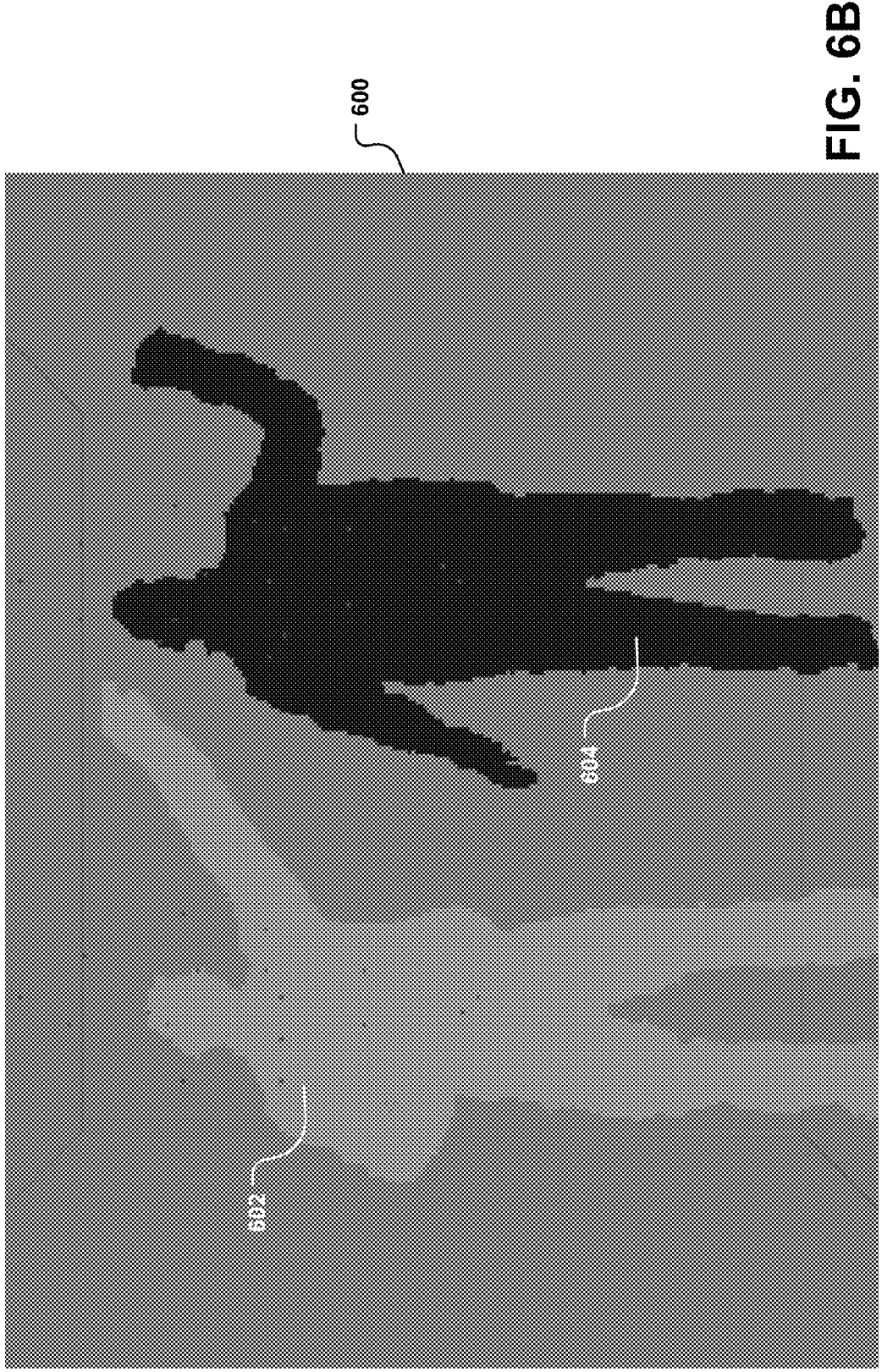
FIG. 6B illustrates an example embodiment of the depth image illustrated in FIG. 6A with a human target segmented or separated from an environment of the depth image.

FIGS. 6B, 9B, and 11C illustrate example embodiments of a depth image with the environment removed. As shown in FIGS. 6B, 9B, and 11C the human target such as the human targets 602, 604 may be isolated in the depth images.

Referring back to FIG. 5, the depth image with the isolated human target may be processed at 530. In one embodiment, the target recognition, analysis, and tracking system may process the depth image with the isolated human target such that a model of the human target in the captured scene may be generated. According to an example embodiment, the model may be tracked, an avatar associated with the model may be rendered, and/or one or more applications executing on a computer environment may be controlled.

For example, according to an example embodiment, a model such as a skeletal model, a mesh human model, or the like of a user such as the user 18 described above with respect to FIGS. 1A and 1B may generated and tracked for one or more movements by the user.

The visual appearance of an on-screen character may then be changed in response to changes to the model being tracked. For example, a user such as the user 18 described above with respect to FIGS. 1A and 1B playing an electronic game on a gaming console may be tracked by the gaming console as described herein. In particular, a body model such as a skeletal model may be used to model the target game player, and the body model may be used to render an on-screen player avatar. As the game player straightens one arm, the gaming console may track this motion, then in response to the tracked motion, adjust the body model accordingly. The gaming console may also apply one or more constraints to movements of the body model. Upon making such adjustments and applying such constraints, the gaming console may display the adjusted player avatar.

In one embodiment, the target recognition, analysis, and tracking system may not be able to process the second depth image at 530. For example, the depth image may be too noisy or include too many empty pixels such that the depth image may not be processed. According to one embodiment, if the depth values may be too noisy, the target recognition, analysis, and tracking system may generate an error message that may be provided to a user such as the user 18 described above with respect to FIGS. 1A and 1B to indicate that another scene may need to be captured.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A system, comprising:
   a processor; and
   a memory communicatively coupled to the processor when the system is operational, the memory bearing processor-executable instructions that, in response to execution by the processor, cause the system to at least:
      receive a depth image of a scene;
      determine a centroid of a target in the scene;
      define a bounding box for the target based on the centroid of the target and a measurement of the target; and
      identify a pixel of the depth image that is outside of the bounding box as being associated with an environment of the scene.

2. The system of claim 1, wherein the memory further bears instructions that, in response to execution by the processor, cause the system to at least:
   define the bounding box for the target from depth history data.

3. The system of claim 2, wherein the memory further bears instructions that, in response to execution by the processor, cause the system to at least:
   track a maximum depth value for the pixel of the depth image; and
   store the maximum depth value in historic depth value data.

4. The system of claim 3, wherein the memory further bears instructions that, in response to execution by the processor, cause the system to at least:
   identify a pixel associated with a floor in the scene; and
   store a depth value of the pixel associated with the floor in the historic depth value data.

5. The system of claim 1, wherein the instructions that, in response to execution by the processor, cause the system to at least define the bounding box for the target further cause the system to at least:
   flood-fill a pixel within the bounding box for the target.

6. The system of claim 5, wherein the instructions that, in response to execution by the processor, cause the system to at least define the bounding box for the target further cause the system to at least:
   define the bounding box for the target using a predetermined edge tolerance value.

7. The system of claim 6, wherein the instructions that, in response to execution by the processor, cause the system to at least define the bounding box for the target using the predetermined edge tolerance value further cause the system to at least:
   adjust the predetermined edge tolerance value based on a measurement of the target, or a position of the pixel.

8. The system of claim 1, wherein the instructions that, in response to execution by the processor, cause the system to at least identify a pixel of the depth image that is outside of the bounding box as being associated with an environment of the scene further cause the system to at least:
   flood-fill the pixel of the depth image that is outside of the bounding box.

9. The system of claim 1, wherein the memory further bears instructions that, in response to execution by the processor, cause the system to at least:
   identify a pixel associated with an infrared shadow in the depth image; and replace a depth value of the pixel associated with the infrared shadow with a calculated depth value.

10. The system of claim 1, wherein the memory further bears instructions that, in response to execution by the processor, cause the system to at least:
    remove the pixel of the depth image that is outside of the bounding box in response to determining that the pixel is outside of the bounding box.

11. A method, comprising:
    receiving a depth image of a scene;
    determining a centroid of a target in the scene;
    defining a bounding box for the target based on the centroid of the target and a measurement of the target; and
    identifying a pixel of the depth image that is outside of the bounding box as being associated with an environment of the scene.

12. The method of claim 11, further comprising:
    defining the bounding box for the target from depth history data.

13. The method of claim 11, further comprising:
    tracking a maximum depth value for the pixel of the depth image; and
    storing the maximum depth value in historic depth value data.

14. The method of claim 13, further comprising:
   identifying a pixel associated with a floor in the scene; and
   storing a depth value of the pixel associated with the floor in the historic depth value data.

15. A computer-readable storage device, bearing computer-readable instructions that, when executed on a computer, cause the computer to perform comprising:
   receiving a depth image of a scene;
   determining a centroid of a target in the scene;
   defining a bounding box for the target based on the centroid of the target and a measurement of the target; and
   identifying a pixel of the depth image that is outside of the bounding box as being associated with an environment of the scene.

16. The computer-readable storage device of claim 15, wherein defining the bounding box for the target comprises:
   flood-filling a pixel within the bounding box for the target.

17. The computer-readable storage device of claim 16, wherein defining the bounding box for the target comprises:
   defining the bounding box for the target using a predetermined edge tolerance value.

18. The computer-readable storage device of claim 17, wherein defining the bounding box for the target using the predetermined edge tolerance value comprises:
   adjusting the predetermined edge tolerance value based on a measurement of the target, or a position of the first pixel.

19. The computer-readable storage device of claim 15, wherein identifying a pixel of the depth image that is outside of the bounding box as being associated with an environment of the scene comprises:
   flood-filling the pixel of the depth image that is outside of the bounding box.

20. The computer-readable storage device of claim 15, further bearing computer-readable instructions that, when executed on the computer, cause the computer to perform comprising:
   identify a pixel associated with an infrared shadow in the depth image; and
   replacing a depth value of the pixel associated with the infrared shadow with a calculated depth value.

* * * * *